(12) United States Patent
Namba et al.

(10) Patent No.: US 8,512,115 B2
(45) Date of Patent: Aug. 20, 2013

(54) VIDEO GAME WITH OFF-SCREEN TARGET ICONS

(75) Inventors: Kazuhiro Namba, Amagasaki (JP); Masatoshi Yamaoka, Sakai (JP); Hironobu Mori, Osaka (JP); Shuichi Myogan, Sakai (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 359 days.

(21) Appl. No.: 12/927,714

(22) Filed: Nov. 22, 2010

(65) Prior Publication Data

US 2011/0130182 A1  Jun. 2, 2011

(30) Foreign Application Priority Data

Nov. 27, 2009 (JP) .................................. 2009-269410

(51) Int. Cl.
*A63F 9/24* (2006.01)

(52) U.S. Cl.
USPC .................... 463/4; 463/31; 463/33

(58) Field of Classification Search
USPC .............................. 463/1–8, 31, 33
See application file for complete search history.

(56) References Cited

U.S. PATENT DOCUMENTS

| 6,270,413 B1 * | 8/2001 | Aikawa et al. ................. 463/31 |
| 6,527,637 B2 | 3/2003 | Fujioka et al. |
| 2001/0006908 A1 | 7/2001 | Fujioka et al. |

FOREIGN PATENT DOCUMENTS

JP  2001-170355  6/2001

OTHER PUBLICATIONS

"Wikipedia Backyard Hockey". From Wikipedia, The Free Encylopedia. [online], [retrieved on Dec. 14, 2012]. Retrieved from the Internet <URL:http://en.wikipedia.org/wiki/Backyard_Hockey>. 1 page.*
"Backyard Hockey manual", [dated 2006]. [online], [retrieved Dec. 10, 2012]. Retrieved from the Internet <URL:http://www.backyardsports.com/sandlot_sluggers/sites/default/files/pdf_downloads/BYHockey_DS_Manual.pdf>. pp. 2-7, 20-23. 6 sheets.*
"Backyard Hockey Nintendo DS Gameplay—Touch Screen Gameplay", [dated 2011]. [online], [retrieved Dec. 10, 2012]. Retrieved from the Internet <URL:http://www.youtube.com/watch?v=zy8GcvNVst4>. 3m 9s video. 1 sheet.*
"Slide to Play X2 Soccer 2009", [dated 2009]. [online], [retrieved on Dec. 10, 2012]. Retrieved from the Internet <URL:http://www.slidetoplay.com/game/x2-soccer-2009>. 1 page.*
"X2 Soccer 2009: iPhone game play", [dated 2009]. [online], [retrieved Dec. 10, 2012]. Retrieved from the Internet <URL:http://www.youtube.com/watch?v=Y1o-8yHTkKQ>. 6m 9s video. 1 sheet.*

* cited by examiner

*Primary Examiner* — Lawrence Galka
(74) *Attorney, Agent, or Firm* — Jordan and Hamburg LLP

(57) ABSTRACT

In a baseball game when a base cannot be displayed on a field display image exists, an icon corresponding to the base is displayed on a straight line, within the field display image, linking a fielder character to the base.

10 Claims, 12 Drawing Sheets

VIDEO GAME WITH OFF-SCREEN TARGET ICONS

BACKGROUND OF THE INVENTION AND RELATED ART STATEMENT

1. Field of the Invention

The present invention relates to a technique for controlling the progression of a game in which a character disposed in a predetermined position within a game space delivers a ball object to a predetermined target position within the game space.

2. Description of the Related Art:

In a conventional baseball game, images of bases, players, and so on become small when a large field is displayed in its entirety on a display screen, making it difficult to advance the game, and therefore the display screen may be divided in two such that an image focusing on a ball is displayed on one of the display screens while an image focusing on a runner is displayed on the other display screen (Japanese Patent Application Publication No. 2001-170355, for example).

Further, smartphones, which are portable telephones that include touch panel display means and are capable of executing games, have become widespread in recent years. When a baseball game is executed on a smartphone, the display screen is extremely small, and therefore, when the display screen is divided as described in Japanese Patent Application Publication No. 2001-170355, displayed images of players and so on are also small. Hence, a baseball game executed on a smartphone conventionally employs a format such as the following.

FIG. 12 shows an example of a screen of a conventional baseball game played on a smartphone. The example in FIG. 12 shows a state immediately after a shortstop fielder character CLS has caught a ground ball and thrown it to first base.

As can be seen in FIG. 12, the fielder character CLS is zoomed such that the first base does not fit within a field display area FA, and therefore the first base is hidden. As a result, a player has no idea how to input an operation for causing the ball caught by the fielder character CLS to be thrown to the first base.

Hence, in a conventional baseball game played on a smartphone, an operating area HA in which the four bases are displayed compactly is provided below the field display area FA, and by touching one of four bases B displayed in the operating area HA, the player can input an operation to throw the ball.

However, with this conventional format, the player simply touches the base B and does not therefore experience a sensation of throwing the ball. A particular feature of a smartphone is that an operation can be performed by sliding a finger over the display screen, but in this conventional game, no thought whatsoever is given to this feature.

SUMMARY OF THE INVENTION

An object of the present invention is to provide a game apparatus and so on for executing a game in which a player can experience a sensation of delivering a ball object after issuing a ball object delivery command and the player can input the delivery command easily without the need to display a separate operating screen.

A game apparatus according to an aspect of the present invention controls a progression of a game in which a character disposed in a predetermined position within a game space delivers a ball object to a predetermined target position within the game space, and includes: an operation display unit which includes a touch panel, and into which a player inputs an operation command; a field display unit for displaying a partial area of the game space including the character on the operation display unit as a field display image; a target position-indicating icon display unit for displaying a target position-indicating icon on a straight line within the field display image linking the character to the target position when the target position exists within the game space but in an area outside the field display image; and a delivery unit for delivering the ball object from the character to the target position when the player inputs a delivery command for delivering the ball object into the operation display unit by moving a finger that maintains contact with the touch panel from the character displayed on the field display image toward the target position-indicating icon.

In a computer-readable recording medium recorded with a game control program according to another aspect of the present invention, the game control program causes a computer to function as a game apparatus for controlling a progression of a game in which a character disposed in a predetermined position within a game space delivers a ball object to a predetermined target position within the game space, wherein the game apparatus includes an operation display unit which includes a touch panel, and into which a player inputs an operation command, and the game control program causes the computer to function as: a field display unit for displaying a partial area of the game space including the character on the operation display unit as a field display image; a target position-indicating icon display unit for displaying a target position-indicating icon on a straight line, within the field display image, linking the character to the target position when the target position exists within the game space but in an area outside the field display image; and a delivery unit for delivering the ball object from the character to the target position when the player inputs a delivery command for delivering the ball object into the operation display unit by moving a finger that maintains contact with the touch panel from the character displayed on the field display image toward the target position-indicating icon.

A game control method according to a further aspect of the present invention controls a progression of a game, in which a character disposed in a predetermined position within a game space delivers a ball object to a predetermined target position within the game space, for a game apparatus having an operation display unit which includes a touch panel, and into which a player inputs an operation command, the game control method including: a field display step in which the game apparatus displays a partial area of the game space including the character on the operation display unit as a field display image; a target position-indicating icon display step in which the game apparatus displays a target position-indicating icon on a straight line, within the field display image, linking the character to the target position when the target position exists within the game space but in an area outside the field display image; and a delivery step in which the game apparatus delivers the ball object from the character to the target position when the player inputs a delivery command for delivering the ball object into the operation display unit by moving a finger that maintains contact with the touch panel from the character displayed on the field display image toward the target position-indicating icon.

DETAILED DESCRIPTION OF THE PREFERRED EMBODIMENTS OF THE INVENTION

The invention is now described, by way of example, with reference to the accompanying drawings.

Figure 1:
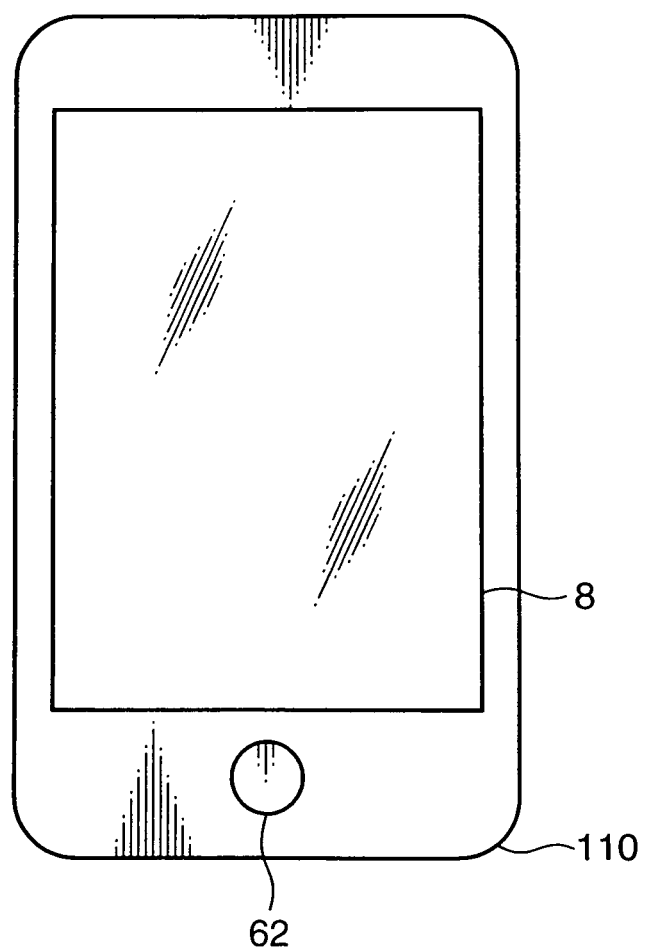
FIG. 1 is an external view of a game apparatus according to an embodiment of the present invention.

A game apparatus according to an embodiment of the present invention will be described below with reference to the drawings. FIG. 1 is an external view of a game apparatus according to an embodiment of the present invention. As shown in FIG. 1, the game apparatus is constituted by a smartphone, which is a portable telephone having a touch panel display unit, and includes a casing 110, a display unit 8, a microphone 62, and so on. Note that the game apparatus shown in FIG. 1 is merely an example, and a portable terminal having a touch panel display unit such as a PDA (Personal Data Assistance) or a portable game apparatus having a touch panel display unit may be employed as the game apparatus instead.

The casing 110 has a flat plate shape. The display unit 8 occupies substantially the entire area of a main surface of the casing 110 and is constituted by a touch panel display apparatus. A player inputs various operation commands into the game apparatus by touching or sliding a finger over the display unit 8. The microphone 62 is provided in an area of the main surface of the casing 110 on a lower side of the display unit 8.

Figure 2:
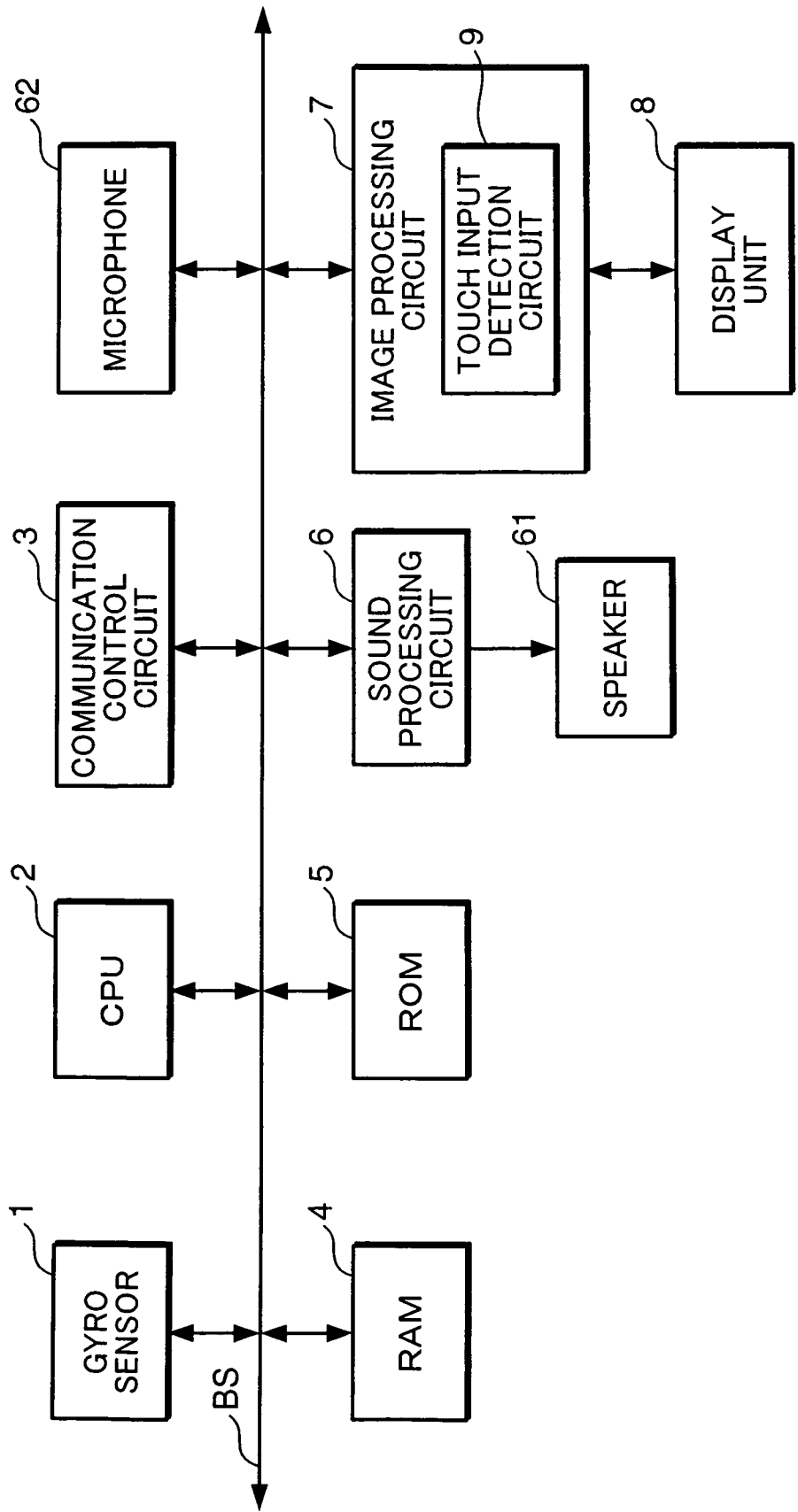
FIG. 2 is a block diagram of the game apparatus according to an embodiment of the present invention.

FIG. 2 is a block diagram of the game apparatus according to an embodiment of the present invention. The game apparatus shown in FIG. 2 includes a gyro sensor 1, a CPU (Central Processing Unit) 2, a communication control circuit 3, a RAM (Random Access Memory) 4, a ROM (Read-Only Memory) 5, a sound processing circuit 6, an image processing circuit 7, the display unit 8, a speaker 61, and the microphone 62. The respective blocks from the gyro sensor 1 to the image processing circuit 7 and so on shown in FIG. 2 are connected to each other via a bus line BS.

The gyro sensor 1 is constituted by a triaxial gyro sensor capable of detecting an attitude of the game apparatus in a roll direction, a pitch direction, and a yaw direction, for example.

The CPU 2 interprets commands from a game control program stored in the ROM 5 and performs various types of data processing and control. The communication control circuit 3 performs processing to diffuse transmission subject data generated by the CPU 2 through CDMA (Code Division Multiple Access) or the like, processing to modulate the diffused data through QAM (Quadrature Amplitude phase Modulation), PSK (Phase Shift Keying), QPSK (Quadrature Phase Shift Keying) or the like, and then transmit the modulated data, and processing to demodulate received data, perform inverse diffusion on the demodulated data, and then output the obtained data to the CPU 2, for example.

The RAM 4 secures a working area for the CPU 2. The ROM 5 is constituted by a rewritable non-volatile storage apparatus, for example, and stores an operating system, a game control program for causing a computer to function as the game apparatus, and so on. The game control program is stored in the ROM 5 after being downloaded from a server provided on a portable telephone communication network, for example.

The sound processing circuit 6 generates an analog sound signal corresponding to a sound generation command from the CPU 2 and outputs the generated signal to the speaker 61. The image processing circuit 7 displays a predetermined image on the display unit 8 by controlling the display unit 8 in accordance with a drawing command from the CPU 2.

The image processing circuit 7 includes a buffer, a touch input detection circuit 9, and so on, and displays various images on the display unit 8. Here, the image processing circuit 7 performs drawing processing with respect to the buffer on the basis of a drawing command issued by the CPU 2 at intervals of a predetermined time T (T=1/60 of a second, for example).

The buffer is divided into a display area (a frame buffer) and a non-display area. The display area is an area for expanding image data to be displayed on a display surface of the display unit 8. The non-display area is a storage area for storing data defining a skeleton, model data defining a polygon, animation data for causing a model to move, pattern data representing the content of each animation, texture data, color palette data, and so on.

Here, the texture data are two-dimensional image data. The color palette data are data for specifying colors of the texture data and so on. The CPU 2 stores these data in the non-display area of the buffer in advance from the game control program stored in the ROM 5 either in a single operation or over a plurality of operations corresponding to the progression of the game.

The drawing command includes a drawing command for drawing a three-dimensional image using a polygon and a drawing command for drawing a normal two-dimensional image. Here, the polygon is a polygonal two-dimensional virtual figure such as a triangle or a rectangle, for example.

The drawing command for drawing a three-dimensional image using a polygon is issued with respect to polygon vertex address data indicating a storage position of polygon vertex coordinate data in the display area of the buffer, texture address data indicating a storage position of a texture to be affixed to the polygon in the display area of the buffer, color palette address data indicating a storage position of the color palette data representing the color of the texture in the display area of the buffer, and brightness data indicating a brightness of the texture.

Of these data, the polygon vertex address data in the display area are substituted by the image processing circuit 7 for polygon vertex coordinate data in two dimensions by coordinate-converting polygon vertex coordinate data in a three-dimensional space from the CPU 2 on the basis of movement amount data and rotation amount data. The brightness data are determined by the image processing circuit 7 on the basis of a distance from a position indicated by the polygon vertex coordinate data from the CPU 2 following the aforesaid coordinate conversion to a virtually disposed light source.

The polygon vertex address data indicate an address in the display area of the buffer. The image processing circuit 7 performs processing to write texture data corresponding to a range of the display area of the buffer defined by three pieces of the polygon vertex address data.

An object such as a character in a game space is constituted by a plurality of polygons. The image processing circuit 7 stores coordinate data for each polygon in a three-dimensional space in the buffer in association with vector data of a corresponding skeleton. Then, when the player performs an operation to cause the character to move on the display screen of the display unit 8 or the like such that a movement of the character is expressed or a viewpoint position from which the character is viewed is changed, processing is performed as follows.

The CPU 2 provides the image processing circuit 7 with three-dimensional coordinate data relating to the vertices of the polygons held in the non-display area of the buffer as well as the movement amount data and rotation amount data of each polygon determined from data indicating skeleton coordinates and an amount of rotation of the skeleton.

The image processing circuit 7 determines the three-dimensional coordinate data successively following a movement and a rotation of each polygon on the basis of the three-dimensional coordinate data of the vertices of each polygon and the movement amount data and rotation amount data of each polygon.

Of the three-dimensional coordinate data of each polygon determined in this manner, horizontal and vertical direction coordinate data are supplied to the buffer as address data in the display area of the buffer, or in other words the polygon vertex address data.

The image processing circuit 7 writes texture data indicated by the pre-allocated texture address data to the display area of the buffer defined by the three pieces of polygon vertex address data. Thus, an object formed by affixing textures to a large number of polygons is displayed on the display screen of display unit 8.

When command means such as a touch pen or a finger of the player directly contacts the display unit 8, for example, the touch input detection circuit 9 outputs coordinate data of a contact position to the CPU 2 to cause the CPU 2 to recognize the contact position.

Further, when the command means directly contacts the position of an object displayed on the display unit 8, the touch input detection circuit 9 outputs coordinate data of the object to the CPU 2 to cause the CPU 2 to acknowledge that the object has been touched.

The display unit 8 is constituted by a liquid crystal panel and a touch pad affixed to a display surface of the liquid crystal panel, for example. An electrostatic capacitance type touch pad or a resistive touch pad is employed as the touch pad, for example, such that a plurality of piezoelectric elements are arranged in a matrix on the display screen. A value that is much smaller than the size of an area of contact between a fingertip and the display screen when the player touches the display screen is employed as an arrangement pitch of the piezoelectric elements constituting the touch pad.

A liquid crystal panel such as a TFT (Thin Film Transistor) or an STN (Super Twisted Nematic), for example, is used as the liquid crystal panel so that 4096 colors can be displayed, for example. Note that instead of a liquid crystal panel, an organic EL (Electric Luminescence) panel or the like may be employed.

Figure 3:
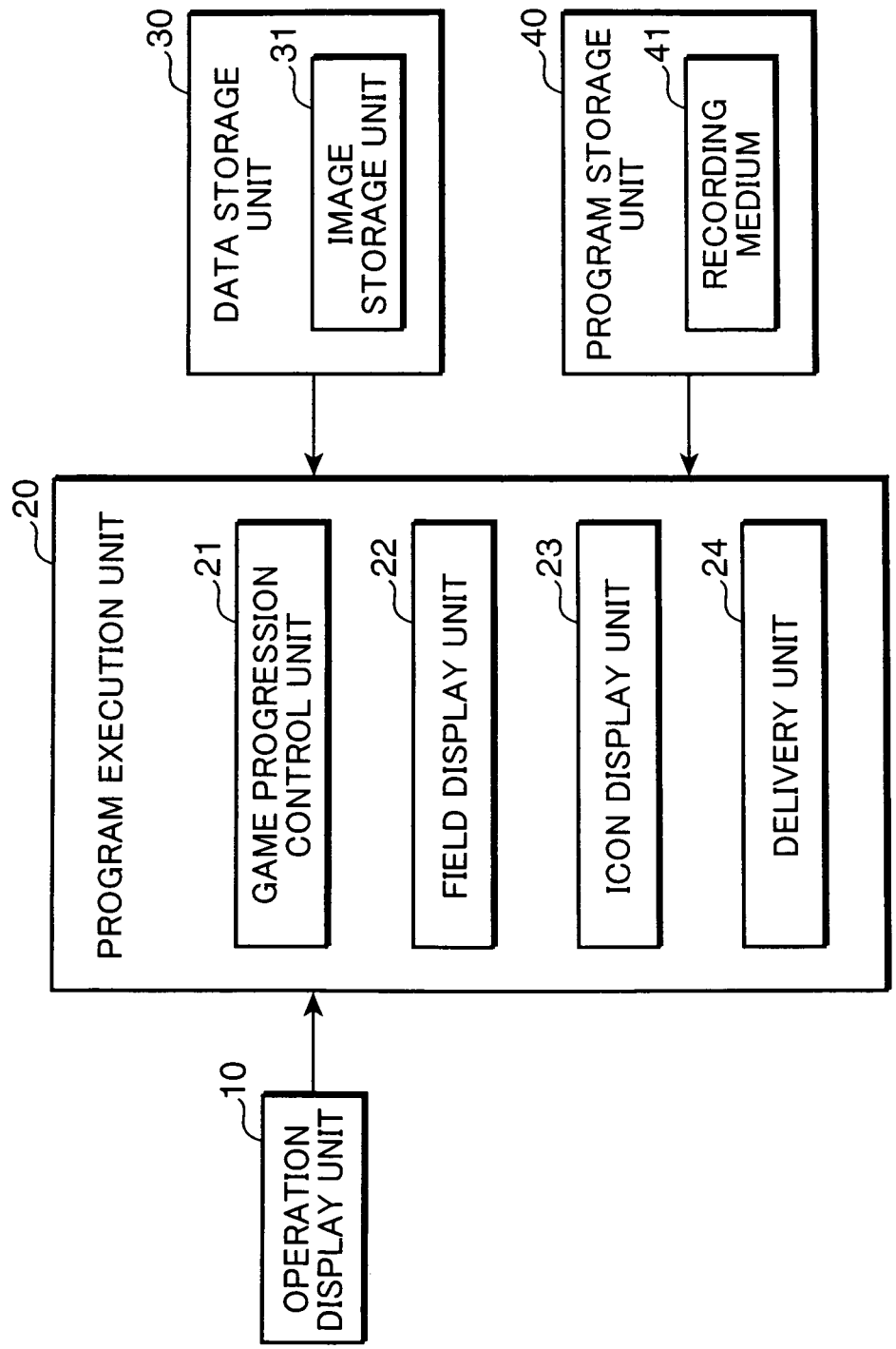
FIG. 3 is a functional block diagram of the game apparatus shown in FIG. 2.

FIG. 3 is a functional block diagram of the game apparatus shown in FIG. 2. The game apparatus includes an operation display unit 10, a program execution unit 20, a data storage unit 30, and a program storage unit 40. A case in which the game apparatus executes a baseball game will be described below as an example.

The operation display unit 10 is constituted by the touch input detection circuit 9 and the display unit 8 shown in FIG. 2, and so on, and serves to receive various operation instructions input by the player and display various game images.

More specifically, when the player is on a fielding side, the operation display unit 10 receives a throwing command to throw a ball object to a pitcher character, a character moving command to move a fielder character in order to catch the ball object, a delivery command to deliver the ball object caught by the fielder character, and so on.

Here, the operation display unit 10 outputs coordinate data constituted by two-dimensional data indicating a position touched by the player on the display screen. In this embodiment, the area of contact between the fingertip of the player and the display screen is detected by the plurality of piezoelectric elements, and therefore the operation display unit 10 determines that the position of a piezoelectric element that detects the greatest pressure, for example, from among the plurality of piezoelectric elements, is the position touched by the player, and outputs coordinate data indicating this position to the program execution unit 20.

Further, when the finger of the player touches the display screen, the operation display unit 10 outputs the coordinate data to the program execution unit 20 at a fixed time interval. Therefore, when the player continues to touch an identical position on the operation screen, the operation display unit 10 outputs the same coordinate data repeatedly. When the player removes the finger from the display screen, on the other hand, the operation display unit 10 stops outputting the coordinate data.

Further, when the player is on an offensive side, the operation display unit 10 receives a hitting command input by the player to determine a hitting timing for hitting the ball object moving within the game space. In this case, the operation display unit 10 displays a hitting command button (not shown) in response to an instruction from the program execution unit 20 and receives the hitting command when the player touches the hitting command button. Having received the hitting command from the player, the operation display unit 10 outputs a timing signal to the program execution unit 20.

Further, when the player is on the offensive side, the operation display unit 10 receives a cursor moving command input by the player to move a meet cursor over the display screen. Here, the player inputs the cursor moving command by tilting the game apparatus itself, for example, rather than touching the display screen. Accordingly, the operation display unit 10 receives the cursor moving command from the player by causing the gyro sensor 1 to detect whether or not the game apparatus has been tilted.

Figure 4:
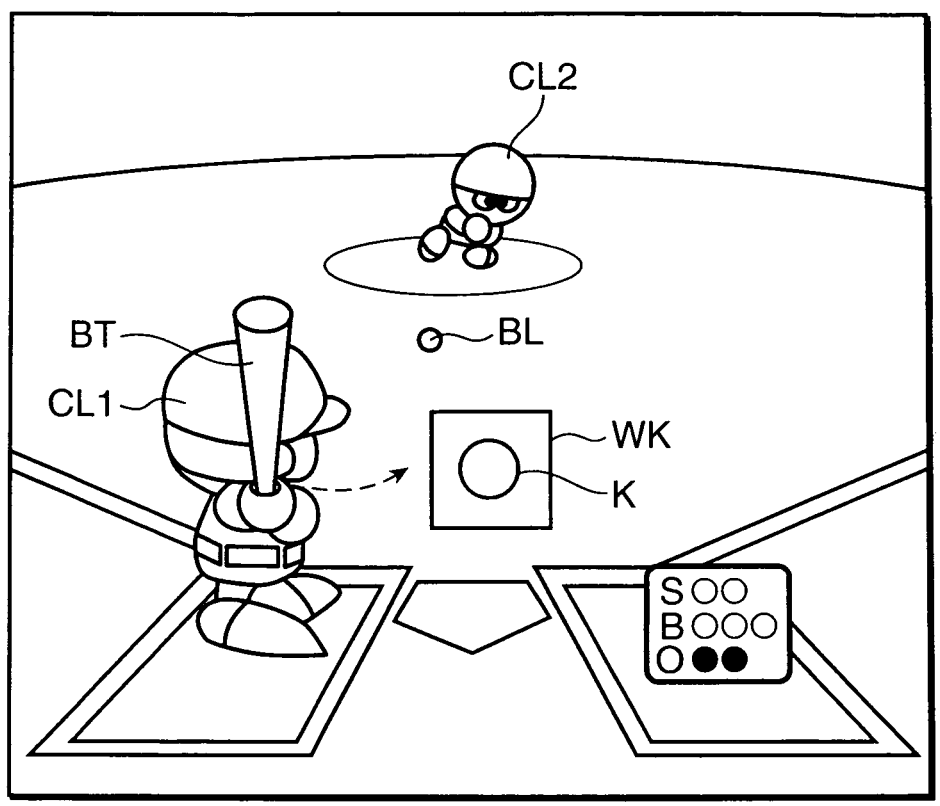
FIG. 4 is a view showing an example of an image of a baseball game displayed on a display screen of an operation display unit.

FIG. 4 is a view showing an example of an image of a baseball game displayed on the display screen of the operation display unit 10. As shown in FIG. 4, in this baseball game, a pitcher character CL2 throws a ball object BL, and a hitter character CL1 hits the ball object BL using a bat object BT.

Here, the player moves a meet cursor K displayed within an outer frame WK indicating a strike zone by tilting the game apparatus itself, predicts a timing at which the ball object BL will arrive in the vicinity of a home base, positions the meet cursor K with respect to the ball object BL, and inputs a hitting command. Accordingly, the bat object BT is shown to swing and the ball object BL is hit.

Returning to FIG. 3, the program execution unit 20 is constituted by the CPU 2 and the image processing circuit 7 shown in FIG. 2, and so on, and includes a game progression control unit 21, a field display unit 22, an icon display unit 23 (an example of a target position-indicating icon display unit), and a delivery unit 24. These functions are realized by having the CPU 2 execute the game control program.

The game progression control unit 21 controls the progression of the baseball game. More specifically, when the player is on the fielding side and inputs a throwing command, the game progression control unit 21 operates the pitcher character to cause the pitcher character to throw the ball object. At this time, the game progression control unit 21 calculates a trajectory of the ball object on the basis of a pitch type and a course instructed by the player.

Here, the game progression control unit 21 may calculate the trajectory of the ball object by correcting a trajectory pattern determined in advance in relation to the pitch type instructed by the player such that the ball object follows the course instructed by the player, for example.

Further, when the player is on the fielding side, the game progression control unit 21 determines whether or not the ball object thrown by the pitcher character is to be hit by the hitter character. In this case, the game progression control unit 21 determines whether or not the ball object is to be hit by executing lottery processing corresponding to an ability value (a batting average, for example) determined in advance in relation to the batter character.

Further, when it is determined that the ball object is to be hit by the hitter character, the game progression control unit 21 calculates the trajectory of the hit ball object and moves the ball object in accordance with the calculated trajectory.

Further, when the player is on the offensive side, the game progression control unit 21 causes the pitcher character to perform a ball throwing operation at a predetermined timing, whereby the pitcher character is caused to throw the ball object.

Here, the game progression control unit 21 sets a lottery probability of each pitch type in accordance with a game phase, the predetermined ability value of the pitcher character, or the like, determines the type and course of the pitch to be executed by the pitcher character by performing lottery processing in accordance with the set lottery probabilities, calculates the trajectory of the ball object on the basis of the determined pitch type and course, and moves the ball object along the calculated trajectory.

Further, when the player is on the offensive side, the game progression control unit 21 moves the meet cursor, which is disposed to be capable of moving within a predetermined planar area of the game space, in accordance with a cursor moving command input into the operation display unit 10.

In this case, the game progression control unit 21 may determine a pitch angle and a yaw angle of the game apparatus from an angular velocity signal output by the gyro sensor 1 in each frame period, set the pitch angle as a vertical direction velocity component of the meet cursor on the game screen, set the yaw angle as a horizontal direction velocity component of the meet cursor on the game screen, and determine a movement velocity and a movement direction of the meet cursor by synthesizing the two velocity components.

Further, upon reception of a timing signal output by the operation display unit 10 using a hit command as a trigger, the game progression control unit 21 determines the hitting timing at which the hitter character hits the ball object on the basis of a reception timing of the timing signal, and when the ball object and the meet cursor K overlap at the determined hitting timing, the game progression control unit 21 determines that the hitter character is able to hit the ball object.

Here, the game progression control unit 21 causes the hitter character to start swinging the bat object from the reception timing of the timing signal, and sets a point at which a predetermined time required to reach a setting surface of the meet cursor in the game space elapses as the hitting timing. When the ball object and the meet cursor K overlap at the hitting timing, the game progression control unit 21 determines that the ball object has been hit by the hitter character.

Furthermore, having determined that the ball object has been hit by the hitter character, the game progression control unit 21 determines the trajectory of the ball object from the position in which the meet cursor overlaps the ball object at the hitting timing, and moves the ball object in accordance with the determined trajectory.

The game progression control unit 21 also determines a distance between the determined trajectory and each fielder character and selects a single fielder character to which the distance is shortest as a fielder character that can be moved by the player. Hereafter, the fielder character that can be moved by the player will be referred to as a fielder character CX.

The field display unit 22 sets a virtual light source, a virtual viewpoint, and a virtual screen in positions of the game space that are determined in advance in accordance with the phase of the game, generates a rendering image by causing the virtual screen to render the game space, generates all or a part of the generated rendering image as a field display image, and displays the field display image on the operation display unit 10.

In this embodiment in particular, when the game progression control unit 21 determines that the hitter character has hit the ball object, the field display unit 22 generates the field display image such that the hit ball object is displayed. Then, when the ball object approaches the fielder character CX, the field display unit 22 generates the field display image such that the fielder character CX is included therein.

When first to third bases and a home base serving as target positions exist within the game space but in an area outside the field display image, the icon display unit 23 synthesizes and displays an icon (an example of a target position-indicating icon) on a straight line within the field display image linking the fielder character CX to a non-displayed base (an example of a non-displayed target position), i.e. a base not displayed on the field display image.

Here, when a plurality of non-displayed bases exist within the game space but in an area outside the field display image, the icon display unit 23 synthesizes and displays icons corresponding respectively to the plurality of non-displayed bases on the field display image.

Figure 5:
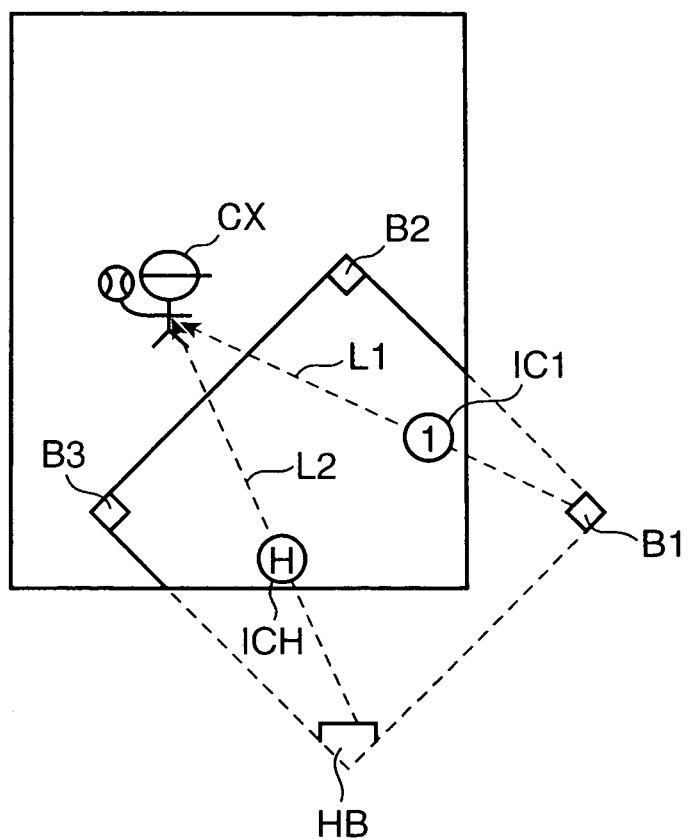
FIG. 5 is a view showing an example of a field display image on which synthesized icons are displayed.

FIG. 5 is a view showing an example of a field display image on which synthesized icons are displayed. In the example shown in FIG. 5, a shortstop fielder character is set as the catching fielder character CX. Note that for ease of description, fielder characters other than the fielder character CX have been omitted from FIG. 5.

The field display unit 22 generates the field display image using the fielder character CX as a reference, and therefore a home base HB and a first base B1 are not included in the field display image.

Hence, an icon IC1 for notifying the player of the direction of the first base B1 is displayed on the field display image in an edge position of the field display image on a straight line L1 linking the fielder character CX to the first base B1. Further, an icon ICH for notifying the player of the direction of the home base HB is displayed in an edge position of the field display image on a straight line L2 linking the fielder character CX to the home base HB.

When the ball object is hit, the field display unit 22 sets the virtual screen and the virtual viewpoint in predetermined positions of the game space such that the entire baseball field can be seen from above, for example. The field display unit 22 then performs rendering to generate a rendering image in which the entire game space is displayed, sets a display frame corresponding to the size of the display screen on the obtained rendering image such that the ball object is displayed, and generates an image within the set display frame as the field display image.

Accordingly, the icon display unit 23 can set a straight line linking a predetermined position (a center of gravity, for example) of the fielder character CX and a predetermined position (a center of gravity, for example) of the non-displayed base, on which an icon is to be displayed, on the rendering image.

Further, the icon display unit 23 sets one non-displayed base as a first non-displayed base and sets a non-displayed base that is closer to the fielder character CX than the first non-displayed base as a second non-displayed base. The icon display unit 23 then sets the icons corresponding to the first and second non-displayed bases as first and second icons, respectively. When an angle formed by a first straight line linking the fielder character CX to the first non-displayed base and a second straight line linking the fielder character CX to the second non-displayed base is equal to or smaller than a predetermined angle, the icon display unit 23 displays the icons such that the first icon is positioned near an edge surface of the field display image and the second icon is positioned further toward the fielder character CX side than the first icon.

Figure 6:
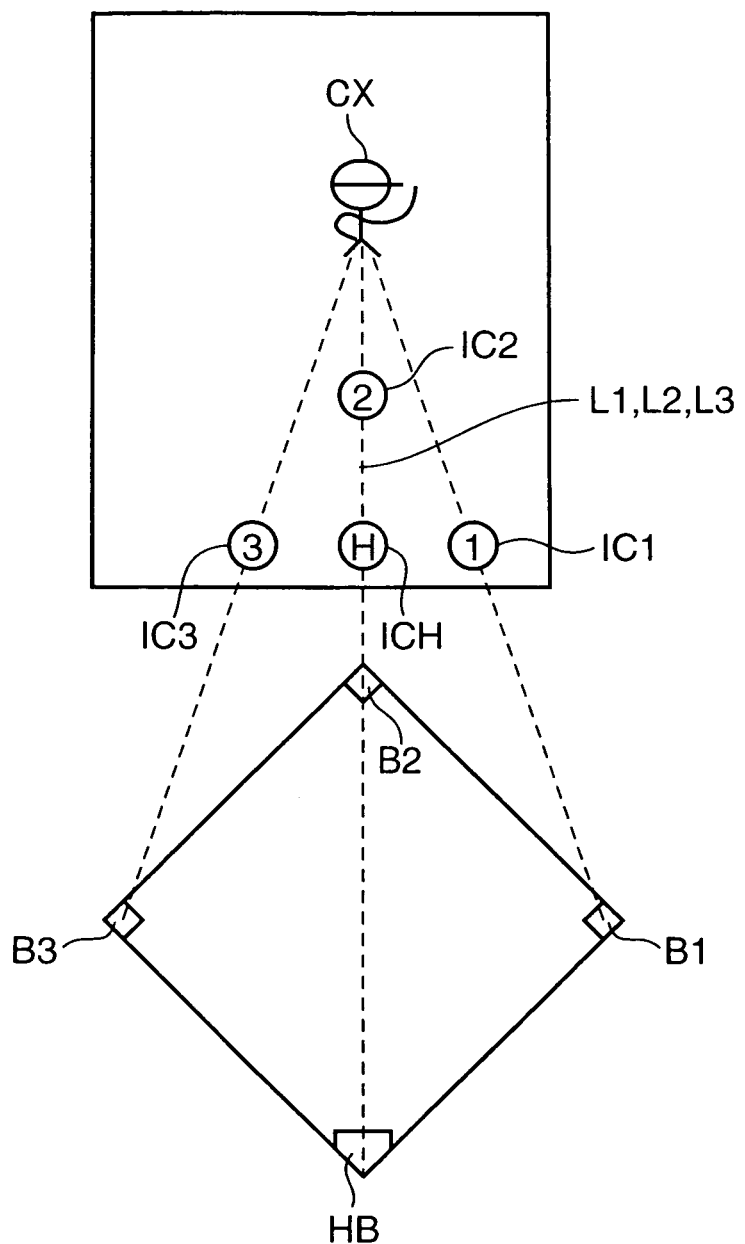
FIG. 6 is a screen diagram showing a display format for indicating a target position in a case where an angle formed by first and second straight lines is equal to or smaller than a predetermined angle.

FIG. 6 is a screen diagram showing a display format for indicating a target position in a case where the angle formed by the first and second straight lines is equal to or smaller than the predetermined angle. In FIG. 6, a center fielder character is set as the fielder character CX. Note that for ease of explanation, fielder characters other than the fielder character CX have been omitted from FIG. 6.

Further, in FIG. 6, all of the first to third bases B1 to B3 and the home base HB are non-displayed bases not included in the field display image. An angle formed by a straight line L1 (an example of the first straight line) linking the fielder character CX and the home base HB (an example of the first non-displayed base) and a straight line L2 (an example of the second straight line) linking the fielder character CX and the second base 2B (second non-displayed base) is zero degrees and therefore equal to or smaller than the predetermined angle. Accordingly, an icon IC2 corresponding to the second base B2 and an icon ICH corresponding to the home base HB are disposed on a straight line L3 (an example of a third straight line) at a fixed interval such that the icon IC2 is positioned on the fielder character CX side and the icon ICH is positioned on the edge of the field display image.

Figure 7:
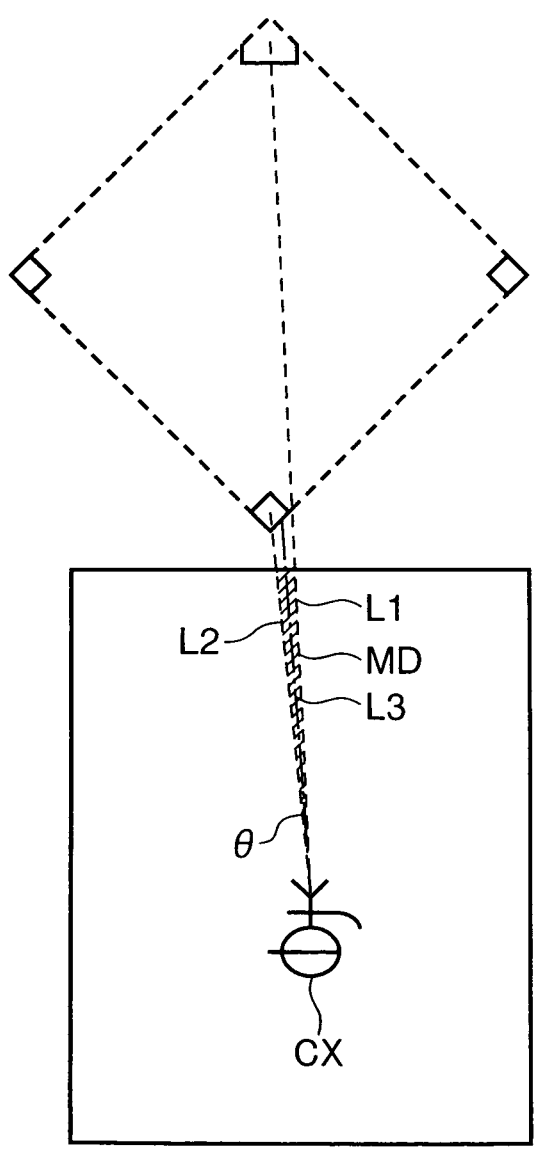
FIG. 7 is a view illustrating processing performed to display icons as shown in FIG. 6.

FIG. 7 is a view illustrating processing performed to display icons as shown in FIG. 6. In FIG. 7, the straight lines L1, L2 are identical to FIG. 6. An angle θ formed by the straight line L1 and the straight line L2 shown in FIG. 7 is equal to or smaller than the predetermined angle. Here, the predetermined angle is set such that when the icon ICH is displayed on the straight line L1 and the icon IC2 is displayed on the straight line L2, the two icons are too close to each other, making it difficult for the player to input a delivery command to be described below. For example, a value of approximately 20 degrees to 30 degrees may be employed as the predetermined angle.

Since the angle θ is equal to or smaller than a predetermined angle, the straight line L3 passing through the fielder character CX is set on the field display image within an area MD surrounded by the straight line L1 and the straight line L2. Here, a straight line obtained by bisecting the angle θ, for example, may be employed as the straight line L3.

Further, the straight line L1 is longer than the straight line L2. Therefore, as shown in FIG. 6, the icons are displayed on the straight line L3 at a fixed interval such that the icon IC2 is positioned on the fielder character CX side and the icon ICH is positioned on the edge of the field display image.

Here, as shown in FIG. 6, approximately half the distance between the fielder character CX and the icon ICH, for example, may be used as the fixed interval. Accordingly, the icons ICH, IC2 may be disposed on the straight line L3 such that the icon ICH is disposed on the edge of the field display image and the icon IC2 is disposed at an intermediate point between the fielder character CX and the icon ICH.

Note that FIG. 6 shows a format in which the icon IC2 and the icon ICH are displayed on the straight line L3, but the present invention is not limited thereto. As shown in FIG. 7, for example, the icon IC2 may be displayed on the straight line L2 and the icon ICH may be displayed on the straight line L1. In this case, to prevent the icon IC2 and the icon ICH from overlapping, the two icons may be displayed in an offset manner such that the icon IC2 is displayed on the fielder character CX side and the icon ICH is displayed on the edge portion side of the field display image.

Figure 8:
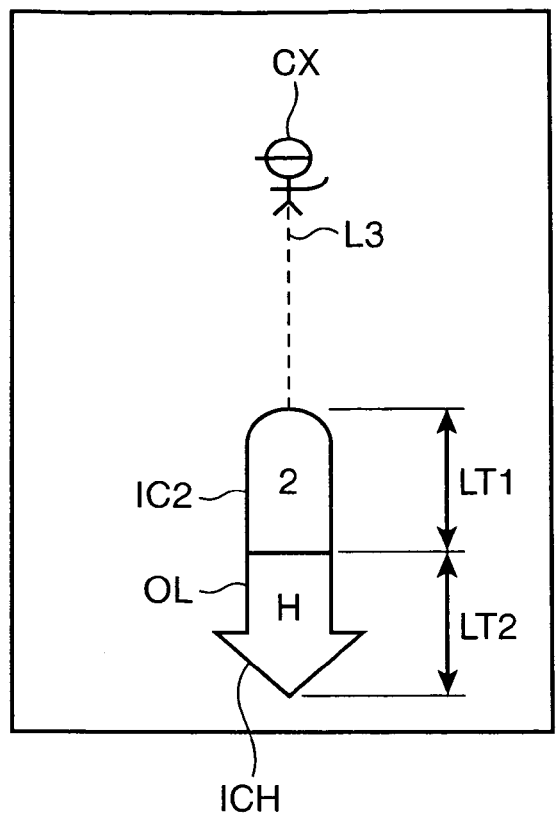
FIG. 8 is a screen diagram showing a modified example of FIG. 6.

FIG. 8 is a view showing a modified example of FIG. 6. In FIG. 8, the icon ICH and the icon IC2 are displayed continuously such that an outer periphery OL thereof takes the shape of an arrow. Further, the arrow formed by the outer periphery OL is oriented from the fielder character CX toward the edge of the field display image on the straight line L3. Accordingly, a tip end of the icon ICH on the edge side of the field display image takes the shape of an arrow. Further, the icon ICH and the icon IC2 take an elongated shape oriented in the direction of the straight line L3, and identical lengths, for example, are employed as a length LT1 of the icon IC2 and a length LT2 of the icon ICH.

Returning to FIG. 3, the icon display unit 23 displays an icon corresponding to a base occupied by a runner using a predetermined display format indicating that the runner is on the base. In this case, when a runner is on the first base B1 and the first base B1 is a non-displayed base, for example, the icon display unit 23 may cause the color of the icon IC1 corresponding to the first base B1 to flash. Alternatively, when a runner is on the first base B1 but a runner is not on the second base, the icon display unit 23 may display the icon IC1 in a different color to the icon IC2.

Further, when a runner moves away from an occupied base, the icon display unit 23 displays the icon corresponding to the base using a predetermined display format indicating that the runner has moved away from the base.

Figure 9A:
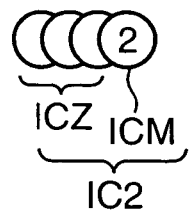
FIGS. 9A to 9C are views showing icon display formats for indicating that a runner has moved away from a base.
Figure 9B:
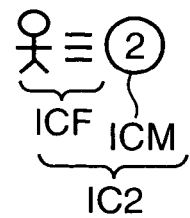
Figure 9C:

FIGS. 9A to 9C are views showing icon display formats indicating that a runner has moved away from a base. FIG. 9A shows the icon IC2 displayed when a runner is on the second base B2 and the runner moves away from the second base B2, for example. The icon IC2 shown in FIG. 9A includes a main icon ICM displayed on a right-side end and a plurality of afterimage icons ICZ (three, for example) displayed adjacent to the main icon ICM on the left side.

Here, the afterimage icons ICZ are displayed in an overlapped manner such that a part thereof is hidden by the afterimage ICZ directly to the right or the main icon ICM.

FIG. 9B, similarly to FIG. 9A, shows the icon IC2 relating to the runner on the second base B2. In FIG. 9B, the icon IC2 is constituted by the main icon ICM and a secondary icon ICF that is disposed adjacent to the main icon ICM on the left side and depicts a running person in simplified form.

FIG. 9C shows an icon IC3 displayed in a display format for notifying the player that a runner may tag up. The icon IC3 shown in FIG. 9C is displayed in a case where an outfielder character is designated as the fielder character CX and there is a possibility that a runner on the third base B3 may tag up, having remained on the third base B3 when a fly ball was caught by the fielder character CX, for example.

Note that FIGS. 9A and 9B were described using the second base B2 as an example, but icons may be displayed in the formats shown in FIGS. 9A and 9B on other bases (the first base B1 and the third base B3).

Further, FIG. 9C was described using the third base B3 as an example, but icons may be displayed in the format shown in FIG. 9C on other bases (the first base B1 and the second base B2).

Moreover, the icons may be constituted more simply. For example, when a runner moves away from a base, an arrow oriented in a running direction may be displayed so as to overlap the main icon ICM, and when the runner starts running or is running, the arrow or the entire main icon ICM may be caused to flash.

Thus, the player can be provided with determination material for determining the base to which the ball object should be delivered.

Returning to FIG. 3, when a finger of the player is moved from the fielder character CX displayed on the field display image toward an icon while maintaining contact with the display screen, a ball object delivery command is input into the operation display unit 10, and as a result, the delivery unit 24 delivers the ball object from the fielder character CX to the non-displayed base corresponding to the icon.

Note that when the delivery unit 24 delivers the ball object, the field display unit 22 scrolls the rendering image appropriately to generate a field display image that includes the ball object.

Here, when a plurality of icons are displayed within the field display image, the delivery unit 24 moves the ball object to the non-displayed base corresponding to the icon positioned at a contact movement destination of the finger.

Figure 10:
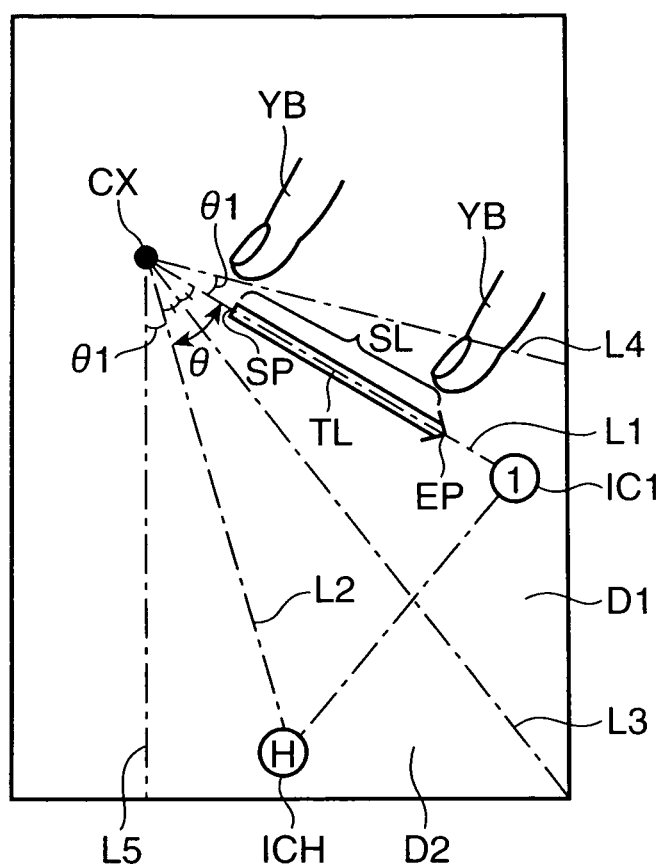
FIG. 10 is a view illustrating processing performed by a delivery unit.

FIG. 10 is a view illustrating processing performed by the delivery unit 24. Note that for ease of description, the fielder character CX is indicated by a dot in FIG. 10. Further, in FIG. 10, the first base B1 and the home base HB are non-displayed bases, and therefore the icons IC1 and ICH corresponding respectively to the first base B1 and the home base HB are displayed.

Here, the delivery unit 24 recognizes a display screen position touched by a finger YB of the player from coordinate data output by the operation display unit 10, and by following this position, the delivery unit 24 obtains a locus TL of the finger that is moved by the player over the display screen in contact therewith.

More specifically, when coordinate data are output from the operation display unit 10 at fixed time intervals and the position indicated by the coordinate data varies, the delivery unit 24 determines that the player is moving the finger YB in contact with the display screen.

On the other hand, when coordinate data are output from the operation display unit 10 at fixed time intervals but the position indicated by the coordinate data does not vary for at least a fixed period or when the finger is removed from the display screen such that the coordinate data are no longer output, the delivery unit 24 determines that the player has terminated the operation for moving the finger YB in contact with the display screen.

Having determined that the player is moving the finger YB in contact with the display screen, the delivery unit 24 specifies a position indicated by the coordinate data output first, from among the series of coordinate data, as a start point SP of the locus TL. Further, the delivery unit 24 specifies a position indicated by the coordinate data output last as an end point EP of the locus TL. The delivery unit 24 then obtains a line on the display screen depicted by dots indicating the series of coordinate data output at fixed time intervals from output of the coordinate data indicating the start point SP to output of the coordinate data indicating the end point EP as the locus TL of the finger YB moved by the player in contact with the display screen.

When a slide amount SL of the finger YB, i.e. a length of the obtained locus TL, is equal to or greater than a fixed length, the delivery unit 24 determines that the finger YB has been slid by the player in order to input a delivery command. Here, a length at which the player can experience a quasi-sensation of delivering the ball object by sliding the finger YB may be employed as the fixed length.

Further, when a plurality of icons are displayed within the field display image, the delivery unit 24 specifies the icon at the contact movement destination by determining an area, from among a plurality of areas D1, D2 set within the field display image, to which the obtained locus TL belongs.

In FIG. 10, the delivery unit 24 sets the straight line L3 by bisecting the angle θ formed by the straight line L1 extending from the fielder character CX to the icon IC1 and the straight line L2 extending from the fielder character CX to the icon ICH. Further, the delivery unit 24 sets a straight line L4 by rotating the straight line L1 toward an opposite side to the straight line L2 by a predetermined angle θ1, and sets an area of the field display image surrounded by the straight line L3 and the straight line L4 as the area D1 corresponding to the icon IC1. Furthermore, the delivery unit 24 sets a straight line L5 by rotating the straight line L2 toward an opposite side to the straight line L1 by the predetermined angle θ1, and sets an area of the field display image surrounded by the straight line U and the straight line L5 as the area D2 corresponding to the icon ICH. Note that a value of approximately 5 to 30 degrees may be employed as θ1.

When the locus TL belongs to the area D1, the delivery unit 24 may determine that the contact movement destination of the finger YB is the icon IC1, and when the locus TL belongs to the area D2, the delivery unit 24 may determine that the contact movement destination of the finger YB is the icon ICH.

The delivery unit 24 then delivers (moves) the ball object to the base corresponding to the icon at the determined contact movement destination of the finger YB. In FIG. 10, for example, when the contact movement destination of the finger YB is determined to be the icon IC1, the delivery unit 24 delivers the ball object to the first base B1, and when the contact movement destination of the finger YB is determined to be the icon ICH, the delivery unit 24 delivers the ball object to the home base HB.

Note that the delivery unit 24 may determine that a delivery command has been input by the player in a case where the player moves a finger in contact with the display screen during a phase of the game in which the fielder character CX has caught the ball object and the ball object caught by the fielder character CX needs to be delivered to one of the bases.

Examples of game phases include times when infield and outfield fielder characters CX catch a ground ball, times when infield and outfield fielder characters CX catch a fly ball while a runner is on a base, and so on.

Further, considering a case in which the two icons IC2, ICH are displayed on the straight line L3 at a fixed interval, as shown in FIG. 6, the delivery unit 24 may determine that the player has input a delivery command to deliver the ball object to the second base B2 corresponding to the icon IC2 displayed on the fielder character CX side when the finger YB moved by the player in contact with the display screen is removed from the display screen such that the end point EP is positioned within the field display image. Further, the delivery unit 24 may determine that the player has input a delivery command to deliver the ball object to the home base HB corresponding to the icon ICH displayed on the edge of the field display image when the finger YB of the player is moved to the exterior of the display screen in contact therewith.

Note that in FIG. 6, the delivery unit 24 may determine that the player has input a delivery command in relation to the base corresponding to the icon, from among the icons IC2, ICH, that is closer to the position in which the finger YB of the player is removed from the display screen after being moved in contact therewith, or in other words the icon that is closer to the position of the end point EP. Further, in FIG. 6, the delivery unit 24 may determine that the player has input a delivery command in relation to the second base B2 corresponding to the icon IC2 when the player moves the finger YB in contact with the display screen up to the icon IC2, and may determine that the player has input a delivery command in relation to the home base HB corresponding to the icon ICH when the finger moved by the player in contact with the display screen passes through the icon IC2.

Furthermore, in FIG. 6, the delivery unit 24 may determine that the player has input a delivery command in relation to the second base B2 corresponding to the icon IC2 when the end point EP of the locus TL of the finger YB moved in contact with the display screen is within the icon IC2, and may determine that the player has input a delivery command in relation to the home base HB corresponding to the icon ICH when the end point EP is within the icon ICH.

Further, in a case where the icon ICH and the icon IC2 are displayed continuously, as shown in FIG. 8, the delivery unit 24 may determine that the player has input a delivery command for delivering the ball object to the second base B2 corresponding to the icon IC2 when the end point EP is positioned within the icon IC2, and may determine that the player has input a delivery command for delivering the ball object to the home base HB corresponding to the icon ICH when the end point EP is positioned within the icon ICH.

Returning to FIG. 3, the data storage unit 30 is constituted by the ROM 5, for example, and functions as an image storage unit 31. The image storage unit 31 stores image data required to realize the baseball game, for example image data depicting the fielder character, the hitter character, the bat object, an image of a ballpark model, the pitcher character, and so on.

The program storage unit 40 is constituted by the ROM 5 or the like, for example, and includes a computer-readable recording medium 41. The recording medium 41 stores the game control program according to the present invention.

Figure 11A:
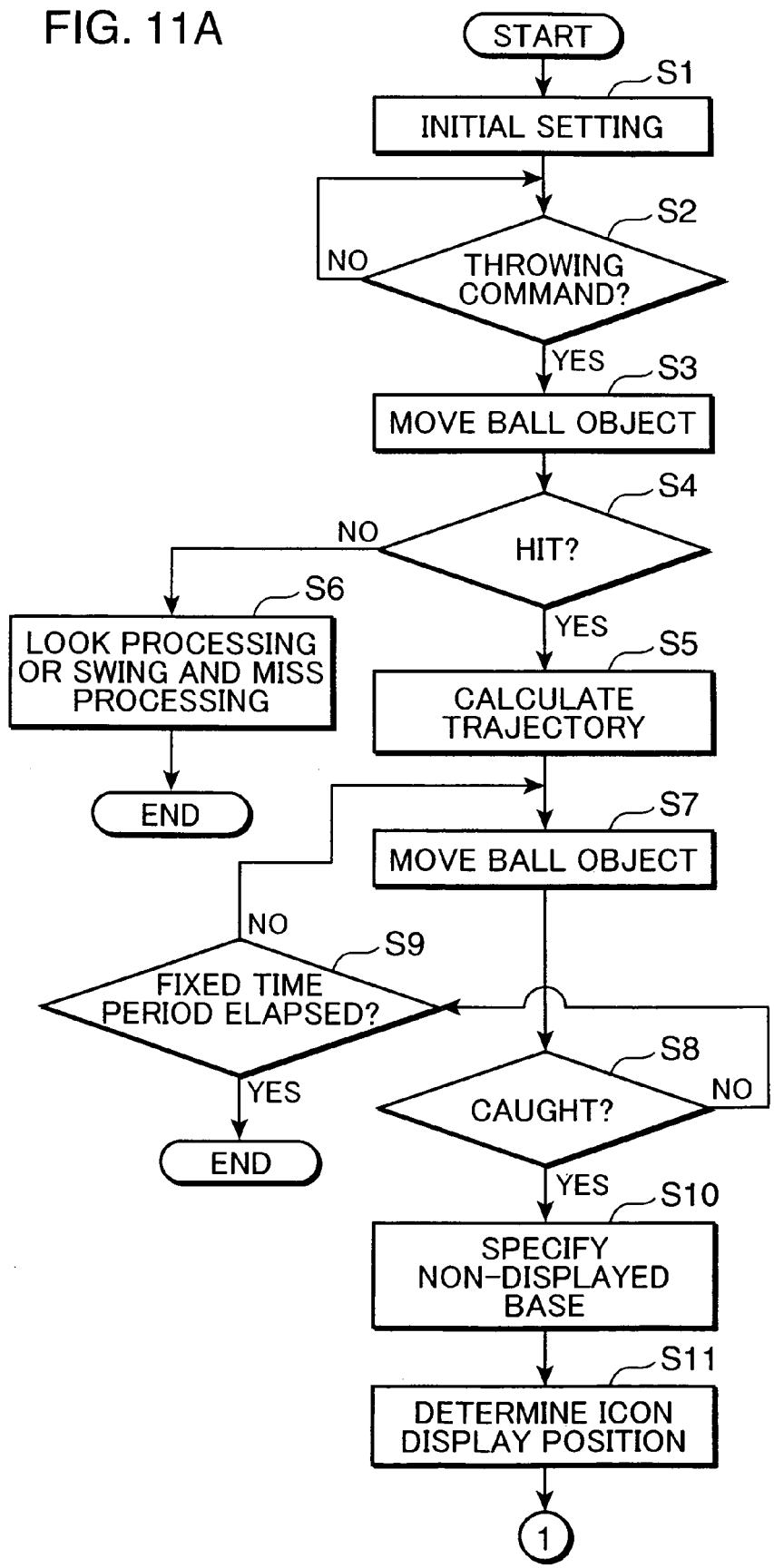
FIGS. 11A and 11B are flowcharts showing an operation of the game apparatus according to an embodiment of the present invention.
Figure 11B:
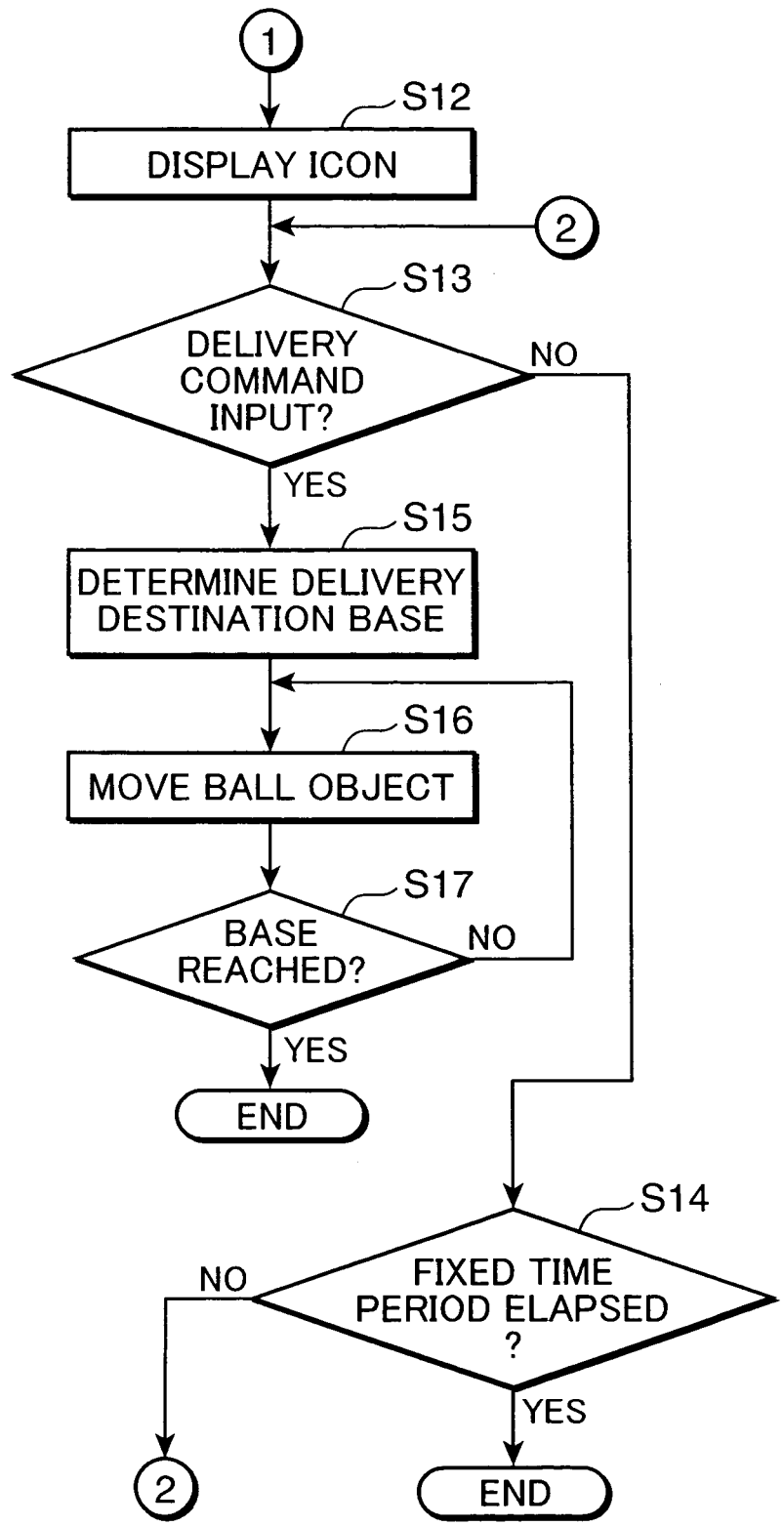
Figure 12:
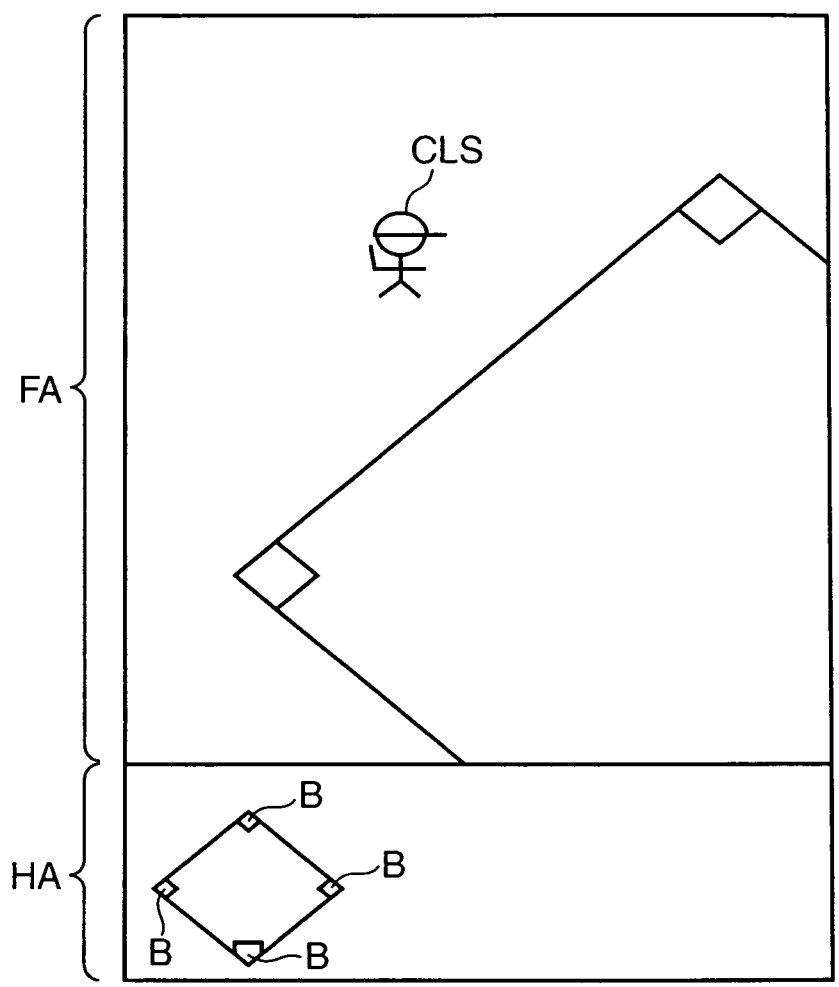
FIG. 12 is an example of a screen image in a conventional baseball game played on a smartphone.

FIGS. 11A and 11B are flowcharts showing an operation of the game apparatus according to an embodiment of the present invention. In these flowcharts, the player is assumed to be on the fielding side. First, in a step S1, the game progression control unit 21 disposes the ballpark model, the hitter character CL1, the bat object BT, fielder characters including the pitcher character CL2, and so on in the game space, causes the field display unit 22 to perform rendering such that an initial field display image is generated, and causes the operation display unit 10 to display the generated field display image. In this case, the operation display unit 10 displays an image such as that shown in FIG. 4, for example. Note that in this embodiment, a virtual three-dimensional space may be employed as the game space.

Next, when the player inputs a throwing command into the operation display unit 10 (YES in a step S2), the game progression control unit 21 calculates the trajectory of the ball object on the basis of the pitch type and the course instructed by the player and moves the ball object in accordance with the calculated trajectory (step S3). At this time, the field display unit 22 updates the field display image shown in FIG. 4 at a predetermined frame rate such that the ball object is shown to move from the pitcher character CL2 toward the hitter character CL1.

When a throwing command is not input (NO in the step S2), on the other hand, the processing returns to the step S2.

Next, the game progression control unit 21 determines through lottery processing whether or not the ball object is to be hit by the hitter character CL1 (step S4). When the game progression control unit 21 determines that the ball object is to be hit (YES in the step S4), the game progression control unit 21 calculates the trajectory of the hit ball object (step S5).

When it is determined that the ball object will not be hit (NO in the step S4), on the other hand, the game progression control unit 21 executes look processing to cause the hitter character CL1 to look at the ball object or swing and miss processing to operate the hitter character CL1 such that the hitter character CL1 swings but misses the ball object (step S6), whereupon the processing is terminated.

Next, the game progression control unit 21 moves the ball object in accordance with the calculated trajectory (step S7). At this time, the field display unit 22 shows the ball object to be moving by generating a field display image including the ball object from the rendering image and updating the generated field display image at a predetermined frame rate.

In this case, when the ball object moves near the edge of the field display image, the field display unit 22 may generate the field display image by scrolling the rendering image such that the ball object is included.

When the fielder character CX appears in the field display image and is displayed in a predetermined position within the field display image, scrolling of the rendering image may be stopped and the field display image may be displayed so that the player can input a command for moving the fielder character CX easily.

Next, when the fielder character CX overlaps the ball object, it is assumed that the fielder character CX has been able to catch the ball object (YES in the step S8), and therefore the game progression control unit 21 advances the processing to a step S10. When the fielder character CX does not overlap the ball object (NO in the step S8), the game progression control unit 21 advances the processing to a step S9.

When a fixed time period does not elapse in the step S9 (NO in the step S9), the game progression control unit 21 returns the processing to the step S7, and when the fixed time period elapses (YES in the step S9), the game progression control unit 21 terminates the processing. In other words, when the hit ball object is not caught by the fielder character CX within the fixed time period, the game progression control unit 21 terminates the processing.

Next, the icon display unit 23 specifies the non-displayed bases that are not displayed on the field display image when the fielder character CX catches the ball object (step S10). Here, when the field display image at the time of the catch is as shown in FIG. 5, for example, the icon display unit 23 specifies the first base B1 and the home base HB as the non-displayed bases.

Next, the icon display unit 23 determines display positions on the field display image of the icons corresponding to the non-displayed bases (step S11) and displays the icons in the determined display positions (step S12).

In the example of FIG. 5, the icon display unit 23 displays the icons IC1, ICH in appropriate positions at the edge of the field display image on the straight lines L1, L2.

In the case of FIG. 6, the icon display unit 23 specifies all of the bases as the non-displayed bases and displays the icons IC1 to IC3 and ICH. Furthermore, in the case of FIG. 6, the angle θ formed by the straight lines L1, L2 is equal to or smaller than the predetermined angle, and therefore the icon display unit 23 displays the icons IC2, ICH at a fixed interval on the straight line L3.

Next, the delivery unit 24 determines whether or not the player has input a delivery command (step S13), and when a delivery command has been input (YES in the step S13), the delivery destination of the ball object is determined from the delivery command (step S15).

In this case, when the contact movement destination of the finger YB input as the delivery command is oriented toward an icon, the delivery unit 24 determines that the non-displayed base corresponding to the icon is the delivery destination of the ball object. Further, when the contact movement destination of the finger YB is oriented toward a base displayed on the field display image, the delivery unit 24 determines that this base is the delivery destination of the ball object.

When a delivery command is not input (NO in the step S13), on the other hand, the processing is terminated following the elapse of a fixed time period (YES in a step S14). When a delivery command is not input (NO in the step S13) and the fixed time period has not elapsed (NO in the step S14), on the other hand, the processing is returned to the step S13. In other words, the delivery unit 24 determines the delivery destination base when the player inputs a delivery command before the elapse of the fixed time period.

Next, the delivery unit 24 delivers the ball object to the base determined as the delivery destination (step S16). In this case, when the delivery destination base does not exist within the field display image, the field display unit 22 generates the field display image such that the ball object is included by scrolling the rendering image and stops scrolling the rendering image when the delivery destination base appears on the field display image. At this time, the game progression control unit 21 disposes a fielder character on the delivery destination base.

Next, when the ball object reaches the delivery destination base (YES in a step S17), the delivery unit 24 stops moving the ball object and terminates the processing. At this time, the game progression control unit 21 causes the fielder character disposed on the base to catch the ball object.

When the ball object does not reach the delivery destination base (NO in the step S17), on the other hand, the delivery unit 24 returns the processing to the step S16, in which ball object movement is continued.

Note that in the above description, a baseball game is used as an example, but the present invention is not limited thereto and may be applied to any game played on a comparatively large field, such as a soccer game, a hockey game, and an American football game.

In these games, a large number of passing characters exist relative to a character that holds the ball object, and therefore the number of non-displayed characters not displayed on the display screen is also large. Hence, when icons corresponding to the positions of all of the non-displayed characters are displayed on the display screen, the display screen becomes difficult to see. Therefore, in a case where a large number of non-displayed characters exist, approximately two to five characters serving as passing characters may be extracted from the large number of characters on the game apparatus side, and the positions of the extracted characters may be displayed by icons as non-displayed target positions.

Further, a case in which two icons are displayed in series on a straight line was illustrated in the above description, as shown in FIGS. 6 and 8, but the present invention is not limited thereto, and three or more icons may be displayed in series on a straight line. In this case, the corresponding icons may be displayed successively from the character side toward the edge of the display screen in order of the distance to the non-displayed target position.

Hence, according to this game apparatus, a partial area of the game space in which the fielder character CX is zoomed can be displayed by the operation display unit 10 as the field display image. When a non-displayed base not displayed on the field display image exists, an icon is displayed within the field display image on a straight line linking the fielder character CX to the non-displayed base. As a result, the player can recognize the direction of the base to which the ball object is to be delivered easily.

When the player inputs a delivery command into the operation display unit 10 by moving a finger in contact with the display screen from the fielder character CX toward an icon, the ball object is delivered from the character to the non-displayed base corresponding to the icon.

Hence, the player can input a delivery command by moving a finger in contact with the display screen, and can therefore experience a more realistic sensation of delivering the ball object than that obtained in a conventional baseball game where a delivery command is input by touching a compactly displayed base.

The technical features of the game apparatus described above can be summarized as follows.

(1) The game apparatus described above controls a progression of a game in which a character disposed in a predetermined position within a game space delivers a ball object to a predetermined target position within the game space, and includes: an operation display unit which includes a touch panel, and into which a player inputs an operation command; a field display unit for displaying a partial area of the game space including the character on the operation display unit as a field display image; a target position-indicating icon display unit for displaying a target position-indicating icon on a straight line within the field display image linking the character to the target position when the target position exists within the game space but in an area outside the field display image; and a delivery unit for delivering the ball object from the character to the target position when the player inputs a delivery command for delivering the ball object into the operation display unit by moving a finger that maintains contact with the touch panel from the character displayed on the field display image toward the target position-indicating icon.

According to these constitutions, a partial area of the game space in which the character is zoomed is displayed on the operation display unit as the field display image. Further, when the target position exists in an area outside the field display image, a target position-indicating icon is displayed within the field display image on a straight line linking the character to the target position. As a result, the player can recognize the target position to which the ball object is to be delivered easily.

When the player inputs a delivery command for delivering the ball object into the operation display unit by moving a finger that maintains contact with the touch panel from the character toward the target position-indicating icon, the ball object is delivered from the character toward the target position.

Hence, when the constitution described above is applied to a scene in which a ball is thrown after being caught during a baseball game, for example, the player can input a delivery command for delivering the ball object by moving a finger that maintains contact with the touch panel from the character toward a target position-indicating icon corresponding to a base to which the player wishes to throw the ball. Therefore, in comparison with a conventional baseball game where a delivery command is input by touching a compactly displayed base, the player can obtain a sensation of having delivered the ball directly him/herself.

(2) When more than one target position exist within the game space but in the area outside the field display image, the target position-indicating icon display unit preferably displays target position-indicating icons corresponding respectively to the plurality of target positions on the field display image.

According to this constitution, when there exists a plurality of non-displayed target positions, i.e. target positions existing in the area outside the field display image, target position-indicating icons corresponding respectively to the plurality of non-displayed target positions are displayed on the field display image. The player then moves a finger that maintains contact with the touch panel from the character toward the target position-indicating icon corresponding to the non-displayed target position to which the player wishes to deliver the ball object. As a result, the ball object is delivered to the non-displayed target position corresponding to the target position-indicating icon at the contact movement destination. Thus, even when a plurality of non-displayed target positions exist, the player can issue a delivery command for delivering the ball object to the desired non-displayed target position easily.

(3) Preferably, when setting a non-displayed target position existing within the game space but in the area outside the field display image as a first non-displayed target position and setting a non-displayed target position that is closer to the character than the first non-displayed target position as a second non-displayed target position, and assuming that target position-indicating icons corresponding to the first and second non-displayed target positions are first and second target position-indicating icons, in a case where an angle formed by a first straight line linking the character to the first non-displayed target position and a second straight line linking the character to the second non-displayed target position is equal to or smaller than a predetermined angle, the target position-indicating icon display unit displays the first and second target position-indicating icons such that the first target position-indicating icon is positioned near an edge surface of the field display image and the second target position-indicating icon is positioned further toward the character side than the first target position-indicating icon.

According to this constitution, a situation in which the first and second target position-indicating icons overlap or are displayed adjacent to each other can be avoided, and therefore the visibility of the icons can be improved. More specifically, in a baseball game played on the game apparatus, for example, a fielder character may deliver a caught ball to a base that is not displayed on-screen. In this case, depending on the position in which the fielder catches the ball, a home base and a second base may be positioned substantially on a straight line from the catching position or in slightly deviating locations. If the target position-indicating icons are simply displayed respectively on the field display screen in this case, the two icons may overlap or be displayed adjacent to each other. When the icons overlap or are displayed adjacent to each other in the case of a game employing a button-operated game controller, for example, it is still possible to perform an operation to select a button corresponding to a desired base or the like. However, the game to which the present invention pertains is a touch panel type game, and therefore the base displayed on-screen may be small in comparison with the size of the player's finger, making it difficult to select the desired base. According to this constitution, on the other hand, the two target position-indicating icons are disposed in an offset manner corresponding to a distance from the character, and therefore a target position-indicating icon can be selected easily even when the player contacts the target position-indicating icon directly with a finger. Moreover, the second target position-indicating icon is displayed on the character side, and therefore the player understands intuitively that the distance of the non-displayed target position (second base, for example) corresponding to the second target position-indicating icon is shorter than the distance of the non-displayed target position (home base, for example) corresponding to the first target position-indicating icon.

In other words, the player can understand intuitively that the closer target position-indicating icon corresponds to second base and the more distant target position-indicating icon corresponds to home base. As a result, the player can quickly recognize the target position-indicating icon corresponding to the base to which the player wishes to deliver the ball object.

(4) The target position-indicating icon display unit preferably displays the first and second target position-indicating icons at a fixed interval, and the delivery unit preferably determines that a delivery command for delivering the ball object to the non-displayed target position corresponding to the second target position-indicating icon has been input by the player when the finger of the player moved while maintaining contact with the touch panel is removed from a display screen of the operation display unit within the display screen, and determines that a delivery command for delivering the ball object to the non-displayed target position corresponding to the first icon has been input by the player when the finger of the player is moved while maintaining contact with the touch panel to an exterior of the display screen of the operation display unit.

According to this constitution, when the first and second target position-indicating icons are displayed at a fixed interval and the player intends to deliver the ball object to the more distant non-displayed target position, the player can move his/her finger that maintains contact with the touch panel to the exterior of the display screen. Hence, an operation command for selecting a target position-indicating icon can be issued easily, and as a result, superior operability can be realized.

In other words, when the ball object is to be delivered to the more distant non-displayed target position, the player does not need to perform an operation to stop his/her finger on the target position-indicating icon corresponding to the more distant non-displayed target position and may simply slide the contacting finger to the exterior of the display screen in a single movement.

When the ball object is to be delivered to the closer non-displayed target position, on the other hand, the player must stop his/her finger on the display screen such that the finger stops on the icon corresponding to the closer non-displayed target position or the like, for example. Therefore, the player simply needs to understand that his/her finger must be stopped in relation to the closer icon but may be slid to the exterior of the display screen in relation to the more distant icon. As a result, the difference between the operations required to select the target position-indicating icons can be understood clearly, and operations can be simplified.

(5) The target position-indicating icon display unit preferably sets a third straight line passing through the character within an area surrounded by the first and second straight lines and displays the first and second target position-indicating icons in a continuous elongated shape on the third straight line, and the delivery unit preferably determines that the player has input a delivery command for delivering the ball object to the non-displayed target position corresponding to the first target position-indicating icon when the finger of the player is moved while maintaining contact with the touch panel to the first target position-indicating icon, and determines that the player has input a delivery command for delivering the ball object to the non-displayed target position corresponding to the second target position-indicating icon when the finger of the player is moved while maintaining contact with the touch panel to the second target position-indicating icon.

According to this constitution, the first and second target position-indicating icons are disposed on the third straight line in an elongated shape and displayed continuously, and therefore the operations for selecting the target position-indicating icons can be performed easily and reliably. For example, a case in which the player wishes to select the target position-indicating icon corresponding to the target position that is further from the character when the angle formed by the first straight line linking the character to the first non-displayed target position and the second straight line linking the character to the second non-displayed target position is not only equal to or smaller than the predetermined angle but also very small may occur in the constitution (3) or (4) described above. In this case, if the closer target position-indicating icon exists in the vicinity of a finger locus extending to the more distant target position-indicating icon, the player's finger may contact the closer target position-indicating icon such that the closer target position-indicating icon is recognized erroneously as having been selected.

Hence, in constitution (5), the third straight line is set and the elongated target position indicating icons are disposed continuously on the third straight line such that the target position-indicating icon disposed in the position where the finger moving in contact stops is selected. As a result, the erroneous recognition problem described above is eliminated. Further, by elongating the target position-indicating icons, leeway is provided in a surface area of the finger movement destination, and therefore the operation for selecting a target position-indicating icon can be performed easily.

(6) Preferably, the game is a baseball game, the character is a fielder character, the non-displayed target position is a base, and the target position-indicating icon display unit displays a target position-indicating icon corresponding to a base occupied by a runner using a predetermined display format indicating that a runner is on a base.

According to this constitution, the target position-indicating icon corresponding to the base occupied by the runner is displayed in a display format indicating this, and therefore, by viewing the target position-indicating icon, the player can quickly recognize the base occupied by the runner. In other words, information indicating the base occupied by the runner can be provided to the player clearly. Further, by providing this information, the player can easily recognize the next target base (the second base) of a runner on a certain base (the first base, for example). For example, when the ball flies to the outfield, the player can be made aware that the second base should be selected as a throwing destination and encouraged to perform an operation to select the second base as the throwing destination. As a result, the player can operate the characters quickly.

When a runner is not present, on the other hand, there is no need to throw the ball object to a particular base immediately even if the ball flies to the outfield, and therefore the player can play the game in a relaxed manner. In other words, the player can perform an off-speed operation. Hence, the game can be enjoyed without the need for excessive concentration even on a portable game apparatus or the like having a small game screen, in which the screen changes rapidly.

(7) When the runner moves away from the base, the target position-indicating icon display unit preferably displays the target position-indicating icon corresponding to the base using a predetermined display format indicating that a runner has moved away from a base.

According to this constitution, when the runner moves away from an occupied base by running toward the next base or the like, the target position-indicating icon corresponding to the base is displayed in a predetermined format indicating this. Hence, the player can quickly obtain information relating to the state of a runner who cannot be viewed on the current display screen. In other words, the player can obtain information indicating that the runner is on or near the base, information indicating that the runner has moved away from the base and intends to tag up or the like, information indicating that the runner has started to run in order to tag up, and so on. As a result, the player can be provided with material for determining whether or not to input a delivery command for achieving a double play or a delivery command for preventing the runner from returning to home base.

As a simple example of the aforesaid display format, when the runner moves away from the base with the intention of tagging up, an arrow pointing toward the next base may be displayed over the target position-indicating icon, and when the runner actually starts running, the arrow, the target position-indicating icon, or both may be caused to flash or the like.

(8) When the runner is about to tag up, the target position-indicating icon display unit preferably displays the target position-indicating icon corresponding to the base occupied by the runner using a predetermined display format indicating that a runner is about to tag up.

According to this constitution, the target position-indicating icon is displayed in a display format indicating a tag-up, and therefore the player can be provided with material for determining whether or not to input a delivery command for preventing the tag-up.

This application is based on Japanese Patent Application Serial No. 2009-269410, filed in the Japan Patent Office on Nov. 27, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A game apparatus for controlling a progression of a game in which a character disposed in a predetermined position within a game space delivers a ball object to a predetermined target position within said game space, comprising:
   an operation display unit which includes a touch panel, and into which a player inputs an operation command;
   a field display unit for displaying a partial area of said game space including said character on said operation display unit as a field display image;
   a target position-indicating icon display unit that displays a target position-indicating icon within said field display image when said target position exists within said game space in an area outside said field display image, said target position being a reference stationary position within the game space that defines the game, said target position-indicating icon being positioned at a location determined by a straight line from said character to said target position, said target position-indicating icon indicating the target position to be in a direction along a straight line path from the character through the target position-indicating icon extending into the off-screen area toward the target position; and
   a delivery unit for delivering said ball object from said character to said target position when said player inputs a delivery command for delivering said ball object into said operation display unit by moving a finger that maintains contact with the touch panel from said character displayed on said field display image toward said target position-indicating icon.

2. The game apparatus according to claim 1, wherein, when more than one target position exist within said game space but in an area outside said field display image, the target position-indicating icon display unit displays target position-indicating icons corresponding respectively to said plurality of target positions on said field display image.

3. The game apparatus according to claim 2, wherein when setting a non-displayed target position existing within said game space but in an area outside the field display image as a first non-displayed target position and setting a non-displayed target position that is closer to said character than said first non-displayed target position as a second non-displayed target position, and assuming that target position-indicating icons corresponding to said first and second non-displayed target positions are first and second target position-indicating icons, in a case where an angle formed by a first straight line linking said character to said first non-displayed target position and a second straight line linking said character to said second non-displayed target position is equal to or smaller than a predetermined angle, said target position-indicating icon display unit displays said first and second target position-indicating icons such that said first target position-indicating icon is positioned near an edge of said field display image and said second target position-indicating icon is positioned further toward said character side than said first target position-indicating icon.

4. The game apparatus according to claim 3, wherein said target position-indicating icon display unit displays said first and second target position-indicating icons at a fixed interval, and said delivery unit determines that a delivery command for delivering said ball object to said non-displayed target position corresponding to said second target position-indicating icon has been input by said player when said finger of said player moved while maintaining contact with the touch panel is removed from a display screen of said operation display unit within said display screen, and determines that a delivery command for delivering said ball object to said non-displayed target position corresponding to said first icon has been input by said player when said finger of said player is moved while maintaining contact with the touch panel to an exterior of said display screen of said operation display unit.

5. The game apparatus according to claim 1, wherein said game is a baseball game, said character is a fielder character, said target position is a base, and said target position-indicating icon display unit displays a target position-indicating icon corresponding to a base occupied by a runner using a predetermined display format indicating that a runner is on a base.

6. The game apparatus according to claim 5, wherein, when said runner moves away from said base, said target position-indicating icon display unit displays said target position-indicating icon corresponding to said base using a predetermined display format indicating that a runner has moved away from a base.

7. The game apparatus according to claim 5, wherein, when said runner is about to tag up, said target position-indicating icon display unit displays said target position-indicating icon corresponding to said base occupied by said runner using a predetermined display format indicating that a runner is about to tag up.

8. A game apparatus for controlling a progression of a game in which a character disposed in a predetermined position within a game space delivers a ball object to a predetermined target position within said game space, comprising:
   an operation display unit which includes a touch panel, and into which a player inputs an operation command;
   a field display unit for displaying a partial area of said game space including said character on said operation display unit as a field display image;
   a target position-indicating icon display unit for displaying a target position-indicating icon on a straight line within said field display image linking said character to said target position when said target position exists within said game space but in an area outside said field display image; and
   a delivery unit for delivering said ball object from said character to said target position when said player inputs a delivery command for delivering said ball object into said operation display unit by moving a finger that maintains contact with the touch panel from said character displayed on said field display image toward said target position-indicating icon; and
   wherein, when more than one target position exist within said game space but in an area outside said field display image, the target position-indicating icon display unit displays target position-indicating icons corresponding respectively to said plurality of target positions on said field display image;
   wherein when setting a non-displayed target position existing within said game space but in an area outside the field display image as a first non-displayed target position and setting a non-displayed target position that is closer to said character than said first non-displayed target position as a second non-displayed target position, and assuming that target position-indicating icons corresponding to said first and second non-displayed target positions are first and second target position-indicating icons, in a case where an angle formed by a first straight line linking said character to said first non-displayed target position and a second straight line linking said character to said second non-displayed target position is equal to or smaller than a predetermined angle, said target position-indicating icon display unit displays said first and second target position-indicating icons such that said first target position-indicating icon is positioned near an edge of said field display image and said second target position-indicating icon is positioned further toward said character side than said first target position-indicating icon; and wherein said target position-indicating icon display unit sets a third straight line passing through said character within an area surrounded by said first and second straight lines and displays said first and second target position-indicating icons in a continuous elongated shape on said third straight line, and wherein said delivery unit determines that said player has input a delivery command for delivering said ball object to said non-displayed target position corresponding to said first target position-indicating icon when said finger of said player is moved while maintaining contact with the touch panel to said first target position-indicating icon, and determines that said player has input a delivery command for delivering said ball object to said non-displayed target position corresponding to said second target position-indicating icon when said finger of said player is moved while maintaining contact with the touch panel to said second target position-indicating icon.

9. A non-transitory computer-readable recording medium recorded with a game control program for causing a computer to function as a game apparatus for controlling a progression of a game in which a character disposed in a predetermined position within a game space delivers a ball object to a predetermined target position within said game space, wherein said game apparatus has an operation display unit which includes a touch panel, and into which a player inputs an operation command, and said game control program causes said computer to function as:

a field display unit for displaying a partial area of said game space including said character on said operation display unit as a field display image;

a target position-indicating icon display unit that displays a target position-indicating icon within said field display image when said target position exists within said game space in an area outside said field display image, said target position being a reference stationary position within the game space that defines the game, said target position-indicating icon being positioned at a location determined by a straight line from said character to said target position, said target position-indicating icon indicating the target position to be in a direction along a straight line path from the character through the target position-indicating icon extending into the off-screen area toward the target position, and a delivery unit for delivering said ball object from said character to said target position when said player inputs a delivery command for delivering said ball object into said operation display unit by moving a finger that maintains contact with the touch panel from said character displayed on said field display image toward said target position-indicating icon.

10. A game control method for controlling a progression of a game, in which a character disposed in a predetermined position within a game space delivers a ball object to a predetermined target position within said game space, for a game apparatus having an operation display unit which includes a touch panel, and into which a player inputs an operation command, said game control method comprising:

a field display step in which said game apparatus displays a partial area of said game space including said character on said operation display unit as a field display image;

a target position-indicating icon display unit that displays a target position-indicating icon within said field display image when said target position exists within said game space in an area outside said field display image, said target position being a reference stationary position within the game space that defines the game, said target position-indicating icon being positioned at a location determined by a straight line from said character to said target position, said target position-indicating icon indicating the target position to be in a direction along a straight line path from the character through the target position-indicating icon extending into the off-screen area toward the target position; and a delivery step in which said game apparatus delivers said ball object from said character to said target position when said player inputs a delivery command for delivering said ball object into said operation display unit by moving a finger that maintains contact with the touch panel from said character displayed on said field display image toward said target position-indicating icon.

* * * * *